United States Patent [19]

Labaziewicz

[11] Patent Number: 4,772,903
[45] Date of Patent: Sep. 20, 1988

[54] DUAL LENS CAMERA

[75] Inventor: Peter Labaziewicz, Rochester, N.Y.

[73] Assignee: Eastman Kodak Company, Rochester, N.Y.

[21] Appl. No.: 143,788

[22] Filed: Jan. 14, 1988

[51] Int. Cl.⁴ .......................... G03B 3/00; G03B 13/02
[52] U.S. Cl. .............................. 354/195.12; 354/150; 354/288
[58] Field of Search ................... 354/150, 195.12, 288, 354/195.1

[56] References Cited

U.S. PATENT DOCUMENTS

| | | |
|---|---|---|
| 2,481,082 | 9/1949 | Chew . |
| 2,506,863 | 5/1950 | Fassin ................................. 354/150 |
| 4,339,193 | 7/1982 | Harvey ................................ 354/288 |
| 4,527,874 | 7/1985 | Ohmura .......................... 354/195.12 |
| 4,609,270 | 9/1986 | Kohno et al. .................. 354/195.12 |
| 4,655,571 | 4/1987 | Ohmura et al. ................ 354/195.12 |
| 4,690,531 | 9/1987 | Hansen et al. ................. 354/195.12 |

Primary Examiner—A. A. Mathews
Attorney, Agent, or Firm—Roger A. Fields

[57] ABSTRACT

In a dual lens camera having a relatively long focal length lens and a relatively short focal length lens selectively used for telephoto and wide angle photography, the lens selection is controlled by movement of a movable mirror with respect to a fixed mirror to establish respective optical pahts for the two lenses. Whenever a back cover of the camera is opened for film loading or unloading, the movable mirror is secured to affix its reflective surface in shielding relation with the reflective surface of the fixed mirror. This is done to prevent dust or other foreign particles entering the surfaces, and to render the reflective surfaces inaccessible to touch.

6 Claims, 4 Drawing Sheets

DUAL LENS CAMERA

BACKGROUND OF THE INVENTION

1. Field of the Invention

The invention generally relates to the field of photography. More particularly, it relates to a dual lens camera of the type wherein a relatively long focal length lens and a relatively short focal length lens are selectively used to expose film in the camera, for example to take a telephoto or a wide angle picture.

2. Description of the Prior Art

Dual lens cameras typical of the prior art are disclosed in U.S. Pat. No. 4,527,874, granted July 9, 1984, and U.S. Pat. No. 4,609,270, granted Sept. 2, 1986. Such a camera often has a relatively long focal length lens and a relatively short focal length lens, either one of which is selectively used for telephoto and wide angle photography. A fixed mirror is permanently located behind the long focal length lens and a movable mirror is positionable in facing parallel relation to the fixed mirror, either behind the long focal length lens or behind an opening for that lens in the front wall of the camera. The movable mirror in this position has a matte black coating on its rear side which is disposed to block ambient light entering the short focal length lens or the wall opening to prevent the light from reaching an exposure aperture covered by a back door of the camera. At the same time, the two mirrors cooperate to define a Z-shaped light-ray path (i.e., one that bends at angles of less than 90°) from the long focal length lens to the exposure aperture. Alternatively, the movable mirror may be pivoted out of its blocking position behind the short focal length lens or the wall opening to a non-blocking position to allow ambient light entering the short focal length lens to pass straight through to the exposure aperture. In the non-blocking position, the movable mirror deflects ambient light reflected by the fixed mirror from the long focal length lens to prevent the light from reaching the exposure aperture. Thus the alternate positions of the movable mirror determine which one of the two lenses is used.

In the dual lens camera disclosed in U.S. Pat. No. 4,527,874, the back door is opened to uncover the exposure aperture to facilitate film loading and unloading. However, when the door is opened and the movable mirror is in its blocking position parallel to the fixed mirror, the reflective surfaces of the two mirrors are generally accessible through the exposure aperture. This is disadvantageous in that it allows dust or other foreign particles which might enter the exposure aperture to reach the reflective surfaces. Moreover, it allows the reflective surfaces to be inadvertently touched and thereby smeared. Conversely, when the door is opened and the movable mirror is in its non-blocking position, the reflective surface of the movable mirror is disposed in shielding relation with the reflective surface of the fixed mirror, making the reflective surfaces of the two mirrors substantially inaccessible through the exposure aperture. This is advantageous in that it prevents dust or other foreign particles which might enter the exposure aperture from reaching the reflective surfaces. Moreover, it prevents the reflective surfaces from being inadvertently touched.

In the dual lens camera disclosed in U.S. Pat. No. 4,609,270, a lens cover is alternately rotatable in opposite directions from an intermediate position covering the long focal length lens and the short focal length lens to respective positions uncovering either of the lenses. When the lens cover is rotated from its position uncovering the short focal length lens to its intermediate position, the movable mirror remains in its non-blocking position. If the back cover is thereafter opened, the reflective surfaces of the two mirrors are substantially inaccessible through the exposure aperture. However, when the lens cover is rotated from its position covering the long focal length lens to its intermediate position, the movable mirror remains in its blocking position. If the back cover is then opened, the reflective surfaces of the two mirrors are generally accessible through the exposure aperture.

Accordingly, in known dual lens cameras, the reflective surfaces of the movable and fixed mirrors are not always shielded against foreign particles or touch when the rear door is opened. This allows the reflective surfaces to be possibly damaged by touch or to be possibly rendered ineffective, or less effective, by dust or other foreign matter.

SUMMARY OF THE INVENTION

The invention is believed to solve the above-described problems associated with known dual lens cameras.

According to the invention, there is provided an improved dual lens camera of the type wherein (a) a back cover is opened to uncover a rear opening, (b) a relatively long focal length lens and a relatively short focal length lens are selectively used to take a picture, and (c) mirror means having a pair of reflective surfaces is adjustable to a long focal length mode for use of said long focal length lens, in which said reflective surfaces assume a relative position making them substantially accessible through said rear opening, and is adjustable to a short focal length mode for use of said short focal length lens, in which the reflective surfaces assume a relative position making them substantially inaccessible through the rear opening, and wherein the improvement comprises:

automatic means for securing said mirror means in its short focal length mode any time that said back cover is opened, whereby said reflective surfaces are prevented from being exposed to foreign matter which might enter said rear opening.

More particularly, said automatic means includes movable means actuated in response to the opening of said back cover for adjusting said mirror means from its long focal length mode to its short focal length mode in the event the mirror means is in its long focal length mode when the back cover is opened.

Accordingly, in the improved dual lens camera, the reflective surfaces of the mirror means are always shielded against foreign matter whenever (i.e., at any time that) the back cover is opened. Thus the reflective surfaces cannot be rendered ineffective by foreign matter as in known dual lens cameras.

DESCRIPTION OF THE PREFERRED EMBODIMENT

The invention is disclosed in connection with a 35 mm still-picture camera. Because such a camera is widely known, this description is directed in particular to photographic elements forming part of or cooperating directly with the invention. It is to be understood, however, that other elements not specifically shown or described may take various forms known to persons of ordinary skill in the art.

Figure 1:
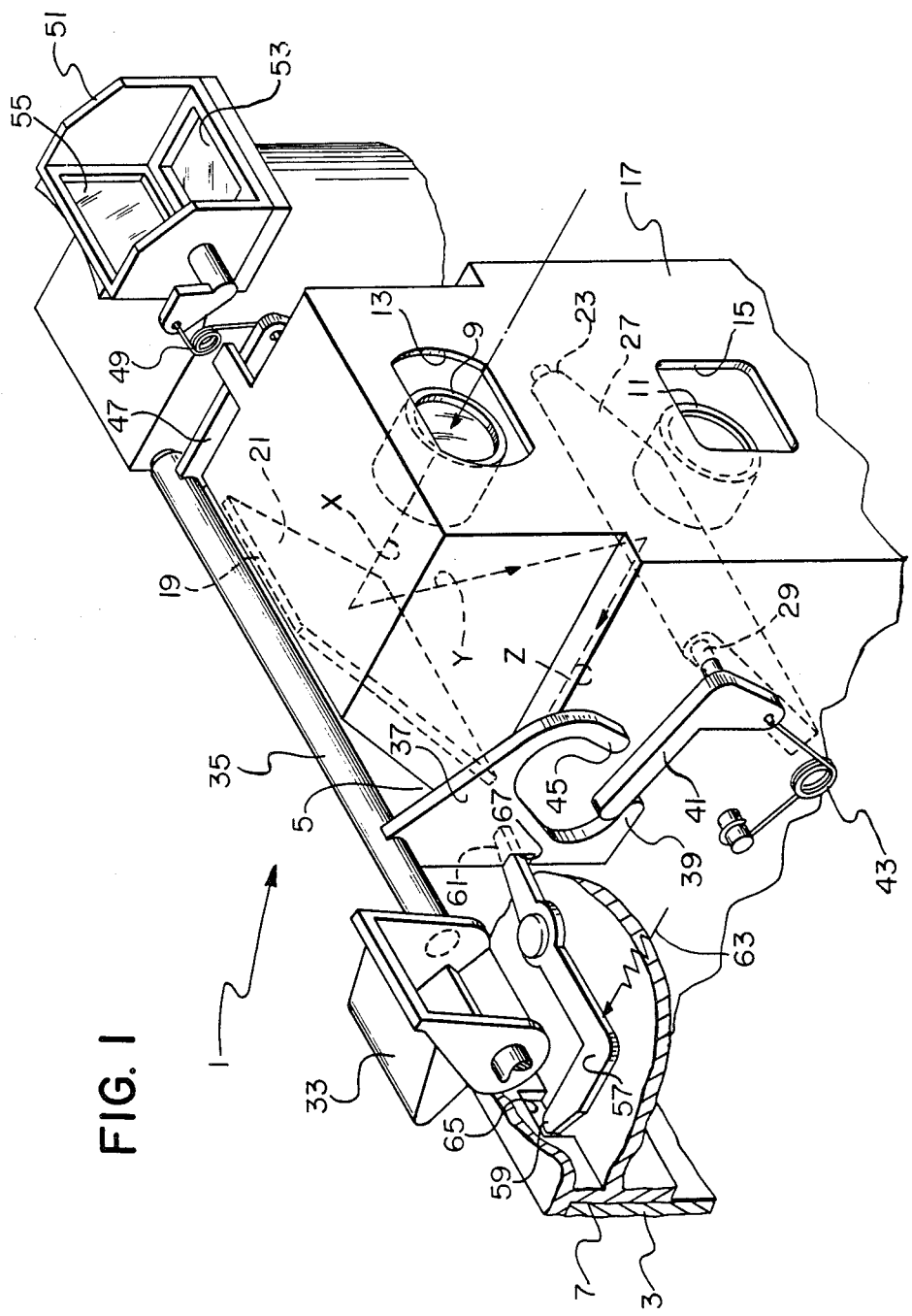
FIG. 1 is a perspective view of an improved dual lens camera according to a preferred embodiment of the invention, showing a movable mirror and a fixed mirror relatively positioned for telephoto photography.
Figure 2:
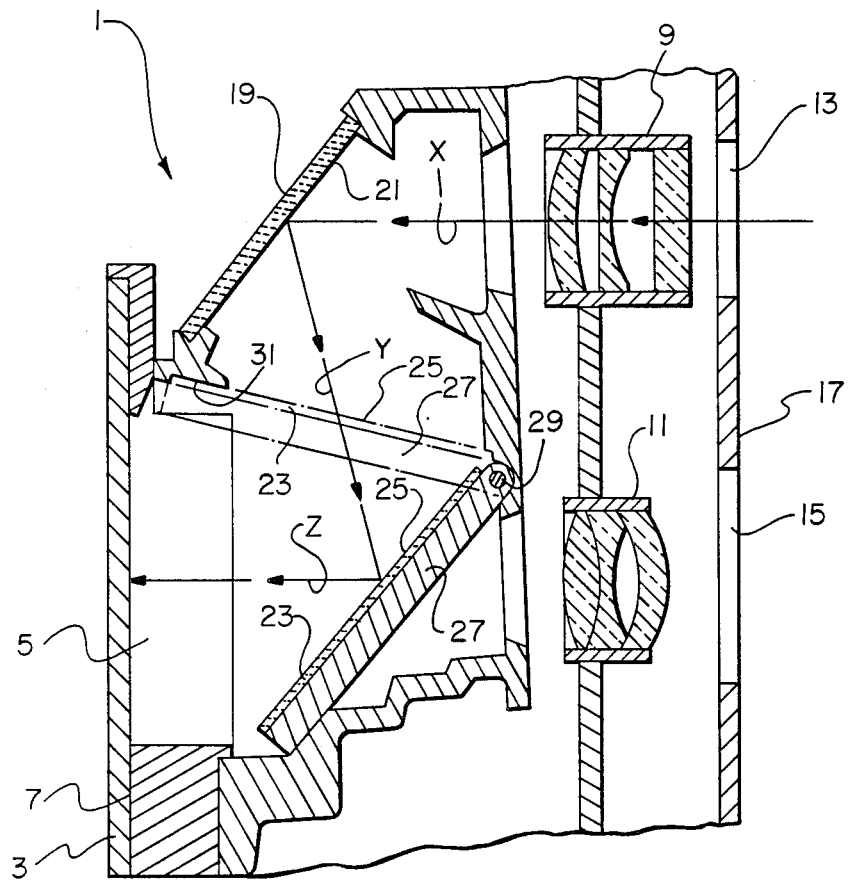
FIG. 2 is an elevation view in cross-section of certain interior details of the camera depicted in FIG. 1.
Figure 3:
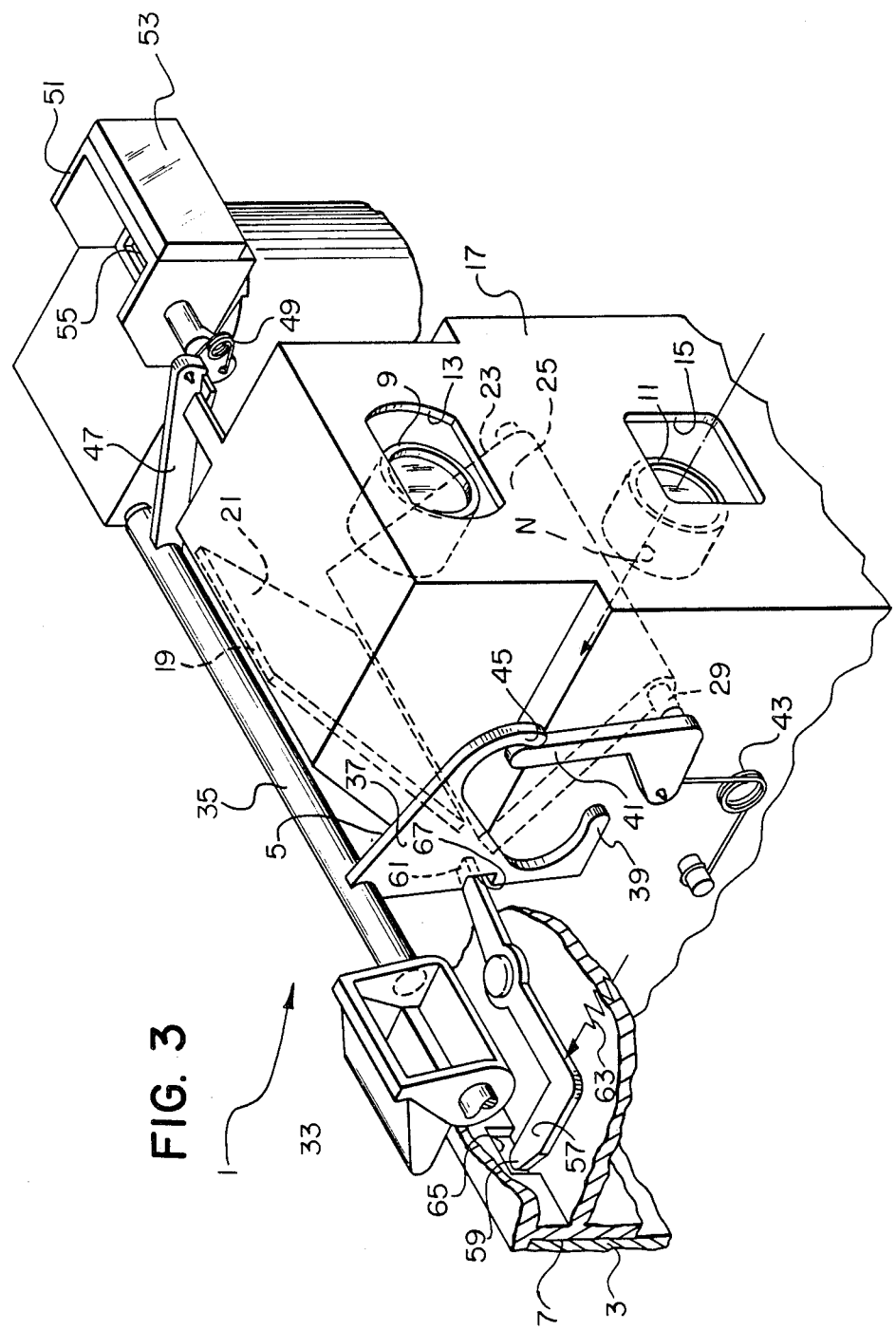
FIG. 3 is a perspective view similar to FIG. 1, showing the two mirrors relatively positioned for wide angle photography.

Referring now to the drawings and in particular to FIGS. 1 and 2, an improved dual lens camera 1 is shown having a pivotally mounted back cover 3 which is swung open to uncover a rear opening, preferably an exposure aperture 5, extending to a rear wall 7 of the camera. As is well known, the back cover 3 is opened to permit film loading and unloading. A relatively long focal length lens 9 and a relatively short focal length lens 11 are arranged in parallel relation behind respective lens openings 13 and 15 in a front wall 17 of the camera 1. A fixed mirror 19 having a reflective surface 21 is permanently located behind the long focal length lens 9, and a movable mirror 23 having a reflective surface 25 is positionable behind the short focal length lens 11 with its reflective surface in facing parallel relation to the reflective surface of the fixed mirror. The movable mirror 23 in this position has a matte black coating 27 on its underside which is disposed to block ambient light entering the short focal length lens 11, to prevent the light from reaching the exposure aperture 5. At the same time, the two mirrors 19 and 23 define a Z-shaped light-ray path (i.e., one that bends at angles of less than 90°) X, Y, Z from the long focal length lens 9 to the exposure aperture 5. Alternatively, as shown in FIG. 3, the movable mirror 23 may be pivoted in a clockwise direction at an integral shaft 29, out of its blocking position behind the short focal length lens 11 to a non-blocking position, to allow ambient light entering the short focal length lens to pass straight through to the exposure aperture 5 along a non-bending light-ray path N. In the non-blocking position, the movable mirror 23 rests against a stop 31 shown in FIG. 2, and it deflects ambient light reflected by the fixed mirror 19 from the long focal length lens 9 to prevent the light from reaching the exposure aperture 5. Thus the alternate positions of the movable mirror 23 shown in FIGS. 1 and 3 determine which one of the two lenses 9 and 11 is used.

A manually operated selector knob 33 is fixed to a selector shaft 35. If the selector knob 33 is located in a telephoto position, as shown in FIG. 1, the movable mirror 23 is located in its blocking position. However, when the selector knob 33 is flipped downwardly from its telephoto position in FIG. 1 to a wide angle position in FIG. 3, a claw or motion-inducing member 37 fixed to the selector shaft 35 is pivoted in a counterclockwise direction in FIG. 1 at the selector shaft to cause a leg 39 of the claw member to kick a lever 41 fixed to the mirror shaft 27 in a clockwise direction in FIG. 1 at the mirror shaft. As a result, an overcenter spring 43 further pivots the lever 41 in the same direction in FIG. 1 against a leg 45 of the claw member 37 to pivot the movable mirror 23 in a clockwise direction in FIG. 1 at the mirror shaft 29 from its blocking position to its non-blocking position. See FIG. 3. At the same time, a lever 47 fixed to the selector shaft 35 is swung by that shaft to cause an overcenter spring 49 to swing a known viewfinder assembly 51 to raise a relatively short focal length element 53 of the viewfinder assembly to a vertical viewing position, as shown in FIG. 3.

Alternatively, when the selector knob 33 is flipped upwardly from its wide angle position in FIG. 3 back to its telephoto position in FIG. 1, the claw member 37 is pivoted in a clockwise direction in FIG. 3 to cause its leg 45 to kick the lever 41 in a counterclockwise direction in FIG. 3. As a result, the overcenter spring 43 further pivots the lever 41 in the same direction in FIG. 3 against the leg 39 of the claw member 37 to pivot the movable mirror 23 in a counterclockwise direction in FIG. 3 back to its blocking position. See FIG. 1. At the same time, the lever 47 is swung by the selector shaft 35 to cause the overcenter spring 49 to swing the viewfinder assembly 51 to raise a relatively short focal length element 55 to a vertical viewing position shown in FIG. 1.

Figure 4:
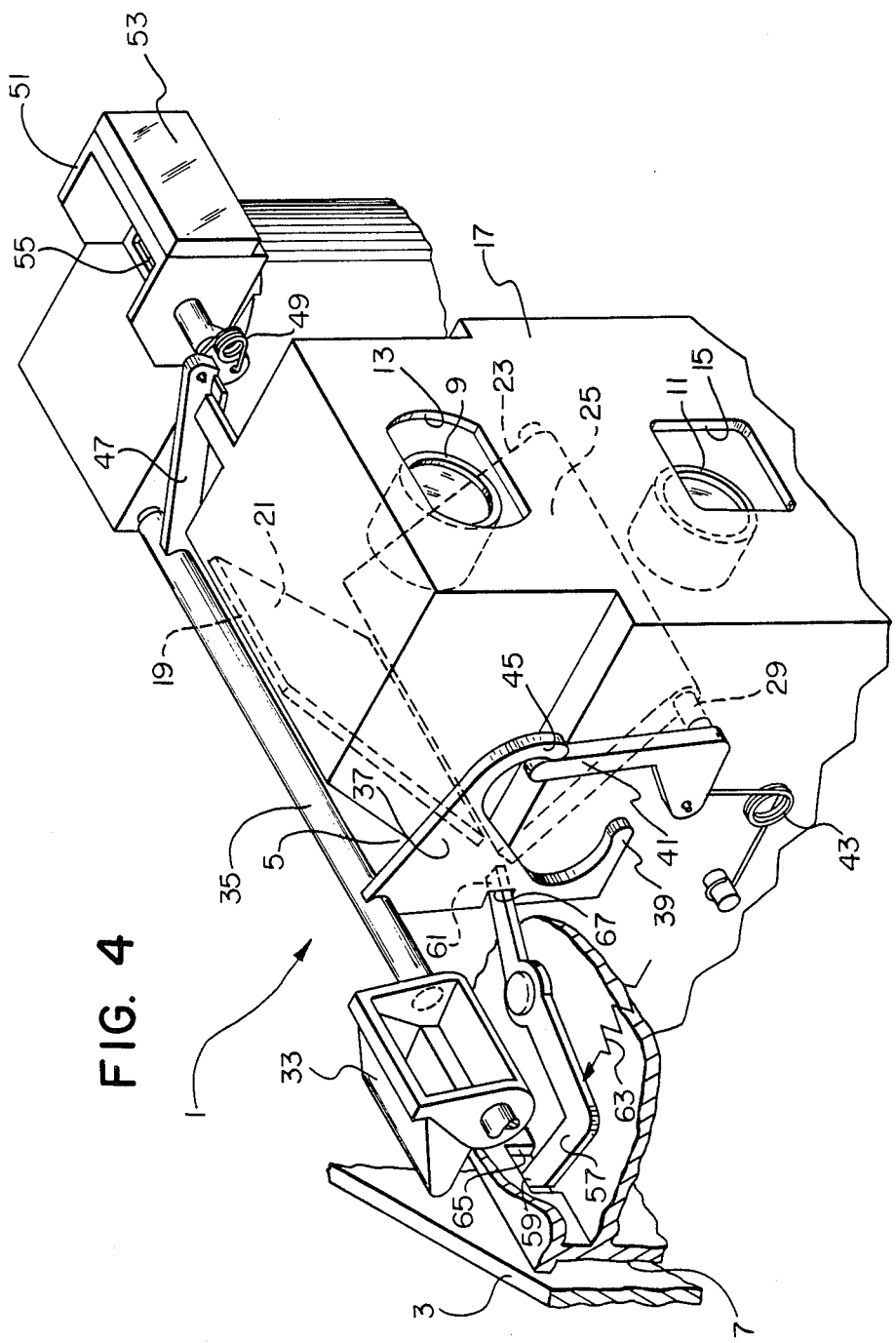
FIG. 4 is a perspective view similar to FIG. 1, showing a back cover of the camera opened.

By comparing FIGS. 1–3, it can be seen that when the movable mirror 23 is in the non-blocking position shown in broken line in FIGS. 2 and 3, its reflective surface 25 is arranged in shielding relation with the reflective surface 21 of the fixed mirror 19 to make the two surfaces inaccessible through the exposure aperture 5, should the back cover 3 be opened. This is advantageous in that it prevents dust or other foreign particles which might enter the exposure aperture 5 from reaching the reflective surfaces 19 and 25. Moreover, it renders the reflective surfaces 19 and 25 inaccessible to touch. In accordance with these advantages there is provided a sensing member 57 pivotally mounted intermediate its two ends 59 and 61. The sensing member 57 is biased by a compression spring 63 to urge its end 59 through a small opening 65 in the rear wall 7, against the back cover 3, to sense whether the back cover is closed, as shown in FIGS. 1 and 2. When the back cover 3 is opened, as shown in FIG. 4, the sensing member 57 is pivoted by the compression spring 63 to move its end 59 through the small opening 65 and to move its end 61 entirely into a notch 67 in the claw member 37. This causes the sensing member 57 to do one of two things with respect to the claw member 37. If the movable mirror 23 is located in its non-blocking position shown in FIG. 3, the end 61 of the sensing member 57 merely engages the claw member 37 to secure the movable mirror in its non-blocking position. If the movable mirror 23 is located in its blocking position shown in FIG. 1, the end 61 of the sensing member 57 first pivots the claw member 37 to cause the movable mirror 23 to be pivoted by the overcenter spring 43 from its blocking position to its non-blocking position, and then it secures the movable mirror in the non-blocking position. See FIG. 4. In either instance, every time that the back cover 3 is opened, the selector knob 33 cannot be manually operated due to the resultant engagement of the end 61 of the sensing member 57 with the claw member 37. Thus the movable mirror 23 is always secured in its non-blocking position.

Operation

When the selector knob 33 is flipped from its telephoto position in FIG. 1 to its wide angle position in FIG. 3, or vice-versa, the movable mirror 23 is pivoted from its blocking position to its non-blocking position, or vice-versa, and either the short focal length element 53 or the long focal length element 55 of the viewfinder assembly 51 is located in a vertical viewing position.

When the back cover 3 is opened and the movable mirror 23 is located in its non-blocking position shown in FIG. 1, the sensor member 57 first pivots the movable mirror from its blocking position to its non-blocking position shown in FIG. 4. Then, the sensing member 57 secures the movable mirror 23 in its blocking position. When the back cover 3 is opened and the movable mirror 23 is already located in its non-blocking position shown in FIG. 3, the sensing member 57 immediately secures the movable mirror in the non-blocking position. In either instance, the sensing member 57 secures the movable mirror 23 in its non-blocking position.

The invention has been described with reference to a preferred embodiment. However, it will be appreciated that variations and modifications can be effected with the ordinary skill in the art without departing from the scope of the invention. For example, when the movable mirror 23 is in the blocking position, it could be moved to the non-blocking position before the back cover 3 is opened, such as in response to the closing of a lens cover (not shown).

I claim:

1. An improved dual lens camera of the type wherein (a) a back cover is opened to uncover a rear opening, (b) a relatively long focal length lens and a relatively short focal length lens are selectively used to take a picture, and (c) mirror means having a pair of reflective surfaces is adjustable to a long focal length mode for use of said long focal length lens, in which said reflective surfaces assume a relative position making them substantially accessible through said rear opening, and is adjustable to a short focal length mode for use of said short focal length lens, in which the reflective surfaces assume a relative position making them substantially inaccessible through the rear opening, and wherein the improvement comprises:

automatic means for securing said mirror means in its short focal length mode any time that said back cover is opened, whereby said reflective surfaces are prevented from being exposed to foreign matter which might enter said rear opening.

2. The improvement as recited in claim 1, wherein said automatic means includes movable means actuated in response to the opening of said back cover for adjusting said mirror means from its long focal length mode to its short focal length mode in the event the mirror means is in its long focal length mode when the back cover is opened.

3. The improvement as recited in claim 2, wherein said movable means includes a motion-inducing member supported for movement between a first position corresponding to the long focal length mode of said mirror means and a second position corresponding to the short focal length mode of the mirror means, to adjust said mirror means to its long focal length mode and to its short focal length mode, and said automatic means includes a sensing member supported for movement to sense whether said back cover is opened and in response to the opening of the back cover engaging said motion-inducing member in the event the motion-inducing member is in its first position, to move said motion-inducing member to its second position, and for engaging the motion-inducing member any time that said motion-inducing member is in its second position, to secure the motion-inducing member in that position.

4. The improvement as recited in claim 3, wherein one of said reflective surfaces of the mirror means is fixed behind said longer focal length lens and the other of said reflective surfaces is alternately positioned by said motion-inducing member in shielding relation with the first-mentioned reflective surface when the motion-inducing member is in its second position, to prevent access to each of said reflective surfaces through said rear opening, and in non-shielding relation with said first-mentioned reflective surface when the motion-inducing member is in its first position, to permit use of said long focal length lens.

5. The improvement as recited in claims 1 or 2, wherein said camera includes selector means manually operable to adjust said mirror means to its long focal length mode and to its short focal length mode, and said automatic means includes means for preventing the manual operation of said selector means any time that said back cover is opened.

6. The improvement as recited in claim 5, wherein said camera includes viewfinder means having a relatively long focal length element corresponding to said long focal length lens and a relatively short focal length element corresponding to said short focal length lens, and said selector means is manually operable to alternately position said long focal length element and said short focal length element for respective viewing in accordance with the adjustment of said mirror means to its long focal length mode or to its short focal length mode.

* * * * *